US012811080B2

(12) United States Patent
Fryshman

(10) Patent No.: US 12,811,080 B2
(45) Date of Patent: Nov. 24, 2026

(54) METHOD AND SYSTEM FOR REMOTELY CONTROLLING A DEVICE USING INDUCTION

(71) Applicant: Bernard Fryshman, Flushing, NY (US)

(72) Inventor: Bernard Fryshman, Flushing, NY (US)

( * ) Notice: Subject to any disclaimer, the term of this patent is extended or adjusted under 35 U.S.C. 154(b) by 0 days.

(21) Appl. No.: 19/313,253

(22) Filed: Aug. 28, 2025

(65) Prior Publication Data

US 2026/0269159 A1 Sep. 10, 2026

Related U.S. Application Data

(60) Provisional application No. 63/766,619, filed on Mar. 4, 2025.

(51) Int. Cl.
*H01H 37/52* (2006.01)
*H02J 50/10* (2016.01)
*H02J 50/60* (2016.01)

(52) U.S. Cl.
CPC ............ *H01H 37/52* (2013.01); *H02J 50/10* (2016.02); *H02J 50/60* (2016.02)

(58) Field of Classification Search
CPC .......... F16L 53/34; F26B 3/347; H01H 37/52; H02J 50/10; H02J 50/60
See application file for complete search history.

(56) References Cited

U.S. PATENT DOCUMENTS 4,484,119 A * 11/1984 Kerr .......................... F16P 3/04 318/563
4,573,032 A * 2/1986 Hickey ................ H01H 85/055 337/401
5,227,596 A * 7/1993 McGaffigan ............ F16L 13/08 219/616
2019/0326743 A1* 10/2019 Govindaraj ........ H01H 37/5409

FOREIGN PATENT DOCUMENTS

CN 118692881 A * 9/2024 ............ H01H 69/02
WO WO-2024243207 A1 * 11/2024 ............ H02H 3/023

* cited by examiner

*Primary Examiner* — Jue Zhang
*Assistant Examiner* — Nicolas Bellido
(74) *Attorney, Agent, or Firm* — Bell & Manning, LLC

(57) ABSTRACT

A system for implementing remote control of a device includes a circuit element within a circuit, where at least a portion of the circuit element is formed from or adjacent to an induction element. The system also includes a device connected to the circuit such that the circuit provides power to the device. The system also includes a controller remote from the device. The controller includes an electromagnetic source that generates electromagnetic radiation to heat the induction element such that the circuit element changes its function or position.

15 Claims, 9 Drawing Sheets

METHOD AND SYSTEM FOR REMOTELY CONTROLLING A DEVICE USING INDUCTION

CROSS-REFERENCE TO RELATED APPLICATION

The present application claims the priority benefit of U.S. Provisional Patent App. No. 63/766,619 filed on Mar. 4, 2025, the entire disclosure of which is incorporated by reference herein.

BACKGROUND

Electrical induction, which can also be referred to as electromagnetic induction, occurs when a changing magnetic field induces a voltage (electromotive force) across a conductor, essentially creating an electric current within that conductor. The conductor can be a ferromagnetic element or other element that generates heat in response to electromagnetic radiation, and the induction occurs when the conductor is either moving through a stationary magnetic field or when a stationary conductor is placed within a changing magnetic field. The source of the magnetic field can be a source that generates electromagnetic radiation.

SUMMARY

An illustrative system for implementing remote control of a device includes a circuit element within a circuit, where at least a portion of the circuit element is formed from or adjacent to an induction element. The system also includes a device connected to the circuit such that the circuit provides power to the device. The system also includes a controller remote from the device. The controller includes an electromagnetic source that generates electromagnetic radiation to heat the induction element such that the circuit element changes its function or position.

In one embodiment, the circuit element comprises a resistor, and the heat causes a resistance of the resistor to change. In another embodiment, the circuit element comprises a switch that closes the circuit in response to the heat. In one embodiment, the switch comprises a bimetallic switch that moves in response to the heat. In another embodiment, the bimetallic switch includes a first metal and a second metal, and where the first metal comprises the induction element. In another embodiment, the circuit element comprises a wire, and a length of the wire changes in response to the heat. In one embodiment, the induction element is embedded within the wire.

In another embodiment, the circuit element comprises a meltable fuse. In one embodiment, the induction element comprises a block of inductive material positioned adjacent to the meltable fuse. In another embodiment, the meltable fuse is part of a movable machine, and the system includes a proximity sensor that determines if the movable machine is within a threshold distance of an object or location. In another embodiment, the controller is configured to automatically activate the electromagnetic source to melt the meltable fuse in response to the movable machine being within the threshold distance of the object or the location. In one embodiment, the object comprises a human being. In another embodiment, the proximity sensor is positioned on the human being. In another embodiment, the electromagnetic source is a portable electromagnetic source positioned on the human being.

An illustrative method for implementing remote control of a device includes forming a circuit element within a circuit, where at least a portion of the circuit element is formed from or adjacent to an induction element. The method also includes connecting a device to the circuit such that the circuit provides power to the device. The method further includes positioning a controller remote from the device, where the controller includes an electromagnetic source that generates electromagnetic radiation to heat the induction element such that the circuit element changes its function or position.

In one embodiment, the circuit element comprises a resistor, and the heat causes a resistance of the resistor to change. In another embodiment, the circuit element comprises a switch that closes the circuit in response to the heat. In another embodiment, the circuit element comprises a wire, and a length of the wire changes in response to the heat. In another embodiment, the circuit element comprises a meltable fuse. In one embodiment, the meltable fuse is part of a movable machine, and the method includes positioning a proximity sensor to determine if the movable machine is within a threshold distance of an object or a location.

The foregoing is a summary of the disclosure and thus by necessity contains simplifications, generalizations, and omissions of detail. Consequently, those skilled in the art will appreciate that the summary is illustrative only and is not intended to be in any way limiting. Other aspects, features, and advantages of the devices and/or processes described herein, as defined by the claims, will become apparent in the detailed description set forth herein and taken in conjunction with the accompanying drawings.

It is noted that the above-referenced figures are representational, and that they are not intended to be limiting with respect to the form and/or shape of the various embodiments.

DETAILED DESCRIPTION

Described herein is the use of induction elements (or sheets), both flexible and rigid, to receive electromagnetic (EM) radiation. Upon receiving electromagnetic radiation, the induction elements are heated in a targeted fashion, thereby enabling controlled action at a distance from the source of radiation. The induction elements can be ferromagnetic elements or any other material that will heat up upon receiving electromagnetic radiation.

Figure 1:
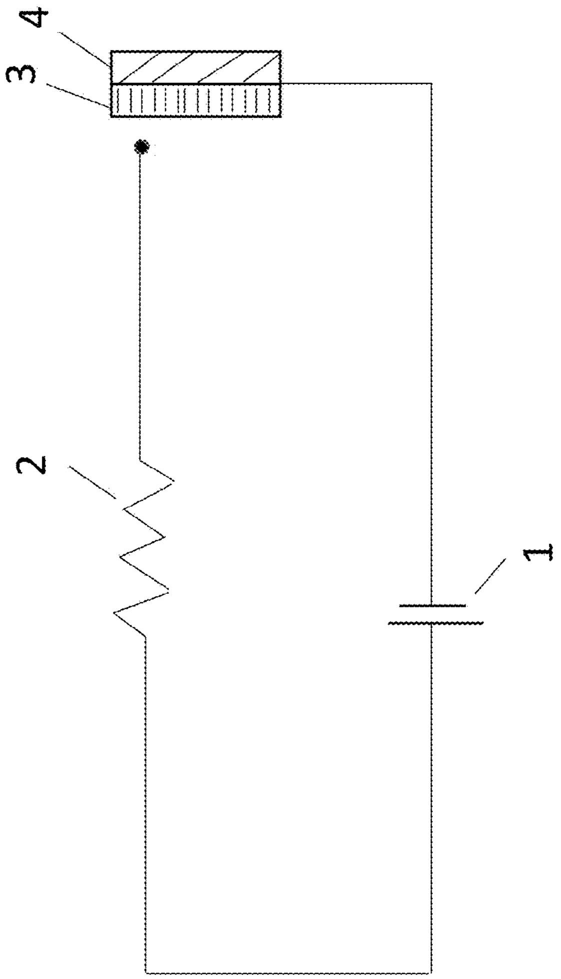
FIG. 1 depicts an induction-controlled circuit in an open configuration in accordance with an illustrative embodiment.
Figure 3:
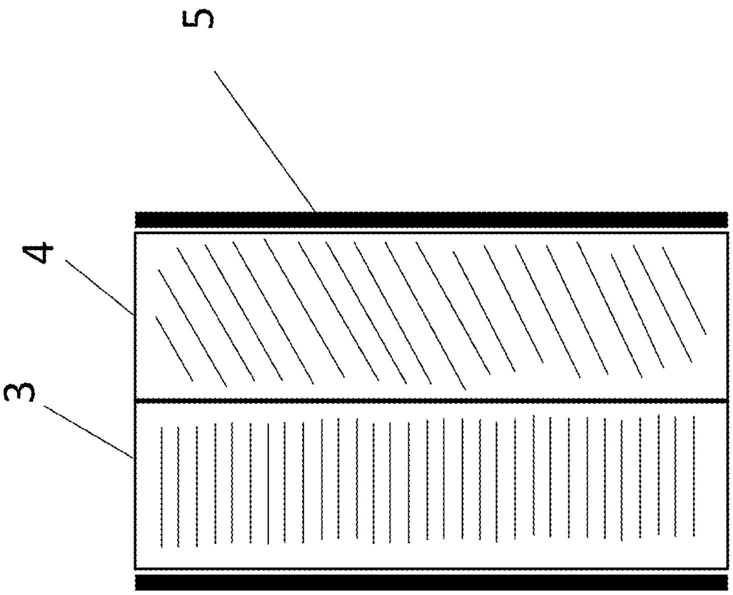
FIG. 3 depicts a bimetallic strip enveloped by a ferromagnetic sheet in accordance with an illustrative embodiment.

FIG. 1 depicts a simple circuit that includes a source of electromotive force (EMF), such as a direct current (DC) battery (1). The circuit also includes a device to be operated (2), and a bimetallic strip with two kinds of metal (3) and (4) that form a switch for the circuit. In an illustrative embodiment, the metal (4) has a larger coefficient of linear expansion than does the metal (3). In one embodiment, both of the metals (3) and (4) can be ferromagnetic or made from another inductive material. In an illustrative embodiment, both of the metals (3) and (4) can be enveloped by a ferromagnetic sheet (or sheet made from another inductive material), as shown in FIG. 3. Specifically, FIG. 3 depicts a bimetallic strip enveloped by a ferromagnetic sheet 5 in accordance with an illustrative embodiment. It is noted that the embodiment of FIG. 1 is only an example and is not meant to be limiting, as more complex circuits with additional types of circuit elements are also envisioned. For example, while a resistor is depicted, the circuit can also include capacitors, inductors, thermistors, etc. Also, as discussed in more detail below, in addition to completing a circuit, the proposed techniques can also be used to disrupt a dangerous or malfunctioning circuit through the use of induction heating.

Figure 2:
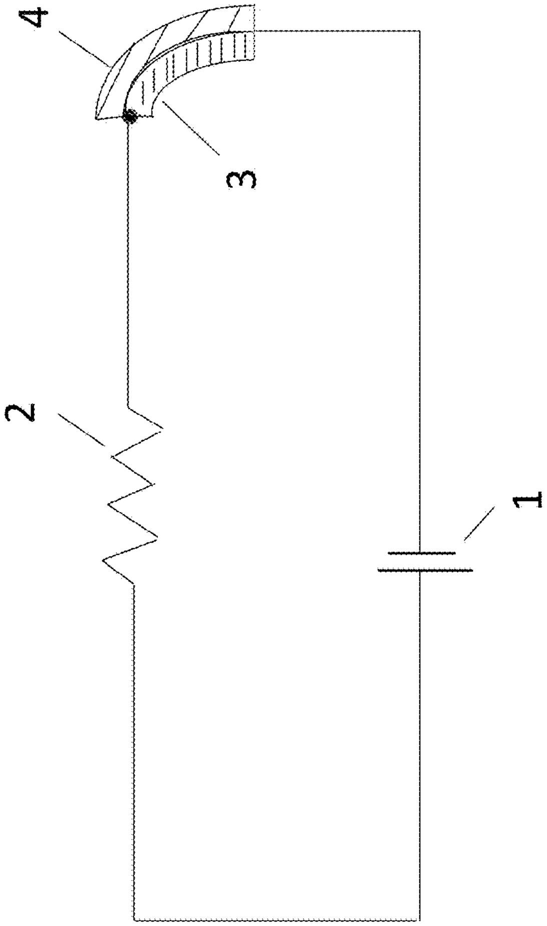
FIG. 2 depicts the induction-controlled circuit in a closed configuration in accordance with an illustrative embodiment.

During normal use, the bimetallic strip can bend and complete the circuit as a result of a rise in ambient temperature (due to receipt of electromagnetic radiation by the induction elements and/or sheet). The bimetallic strip thereby serves as the basis of a non-electronic switch. As such, the individual or system sending the EM radiation can complete the circuit at will to power the device (2) to be operated. Removing the EM radiation will enable the bimetallic strip to cool, straighten out, and break the circuit. FIG. 1 depicts an induction-controlled circuit in an open configuration in accordance with an illustrative embodiment. FIG. 2 depicts the induction-controlled circuit in a closed configuration in accordance with an illustrative embodiment. Thus, described herein is a reliable switch that can be controlled at a distance, such as meters, tens of meters, etc., depending on the EM source used.

Figure 4:
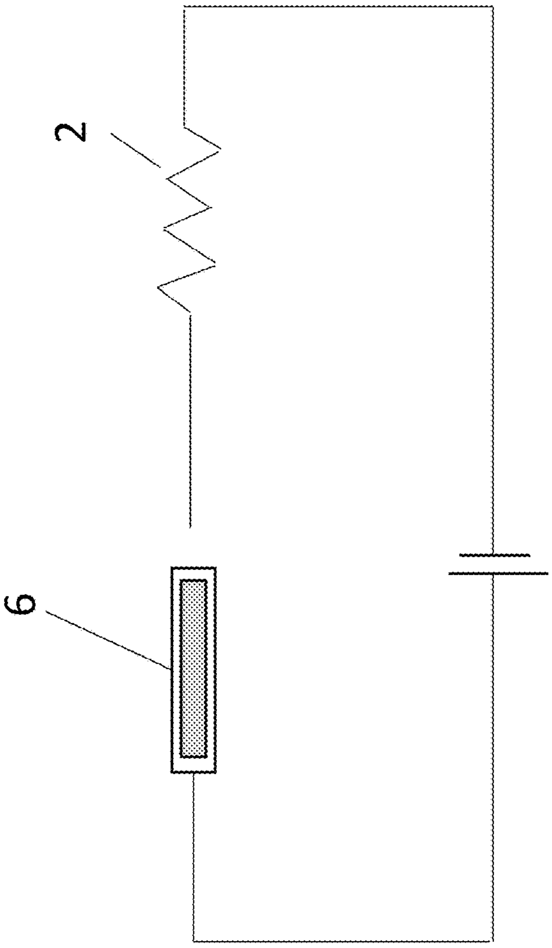
FIG. 4 shows a circuit with a wire switch in an open position in accordance with an illustrative embodiment.
Figure 5:
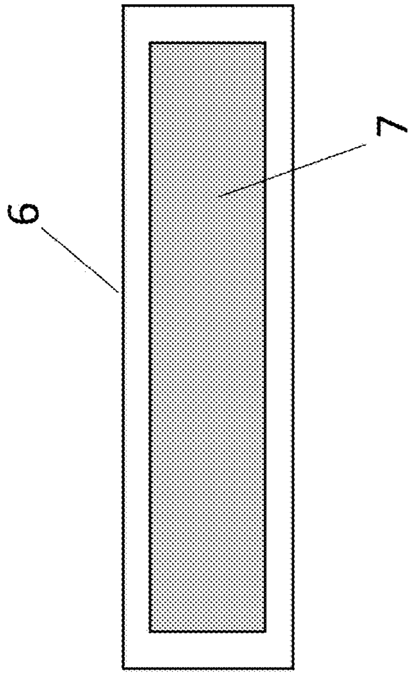
FIG. 5 shows an induction element embedded in a metal wire for use as a circuit switch in accordance with an illustrative embodiment.
Figure 6:
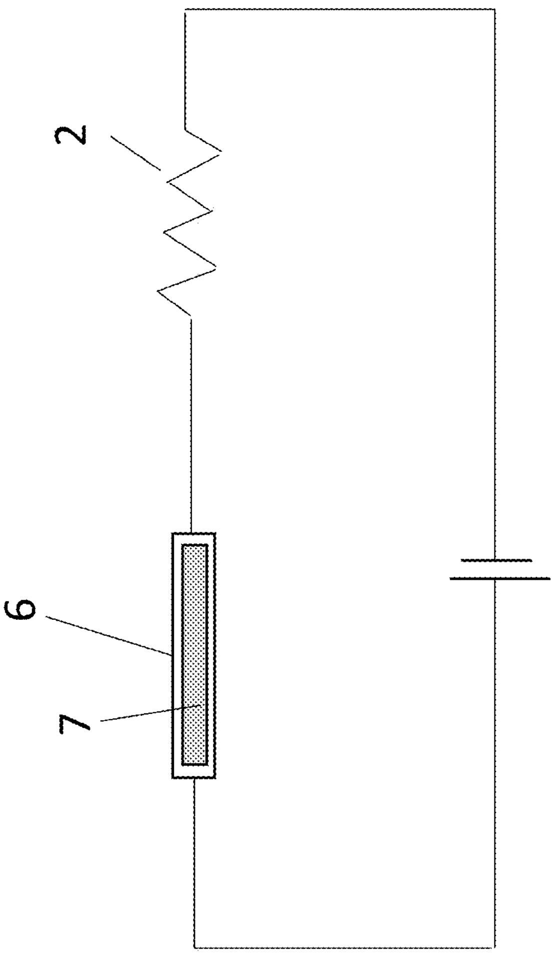
FIG. 6 shows the circuit of FIG. 4 with the wire switch in a closed position in accordance with an illustrative embodiment.

FIG. 4 shows a circuit with an EMF source (1), a device to be operated (2), and a piece of conducting metal (6) with a suitable coefficient of linear expansion. The metal (6) can be in the form of a wire, and can be surrounded by inductive material, attached to inductive material, and/or have inductive (e.g., ferromagnetic) material positioned within it. At a desired time, EM radiation of suitable intensity is sent to heat the metal (6) (i.e., wire), but not other portions of the circuit due to the lack of inductive material elsewhere in the circuit. In accordance with its coefficient of linear expansion, upon being heated in response to the EM radiation, the metal wire (6) expands and completes the circuit. FIG. 4 shows a circuit with a wire switch in an open position in accordance with an illustrative embodiment. FIG. 5 shows an inductive element (7) embedded in a metal wire (6) for use as a circuit switch in accordance with an illustrative embodiment. FIG. 6 shows the circuit of FIG. 4 with the wire switch in a closed position in accordance with an illustrative embodiment.

Additionally, circuit elements (e.g., resistors, thermistors, inductors, capacitors, etc.) can have a changing value of resistance (or other electrical value) depending on their temperature. Encasing such a resistance element in an inductive (e.g., ferromagnetic) coating or enclosure can enable remote control of circuit behavior, by sending EM radiation to target the resistance element. The timing and intensity of the EM radiation can be controlled to achieve the desired circuit effect, such as increased or lowered resistance. Specifically, the EM radiation can interact with and heat the inductive material on or proximate to the resistance element, thereby heating the inductive material and the resistance element. As discussed, the amount of heating controls the overall resistance of the resistance element. Extension to a multiplicity of devices is envisioned, limited only by the design and application of the specific circuit.

Figure 7:
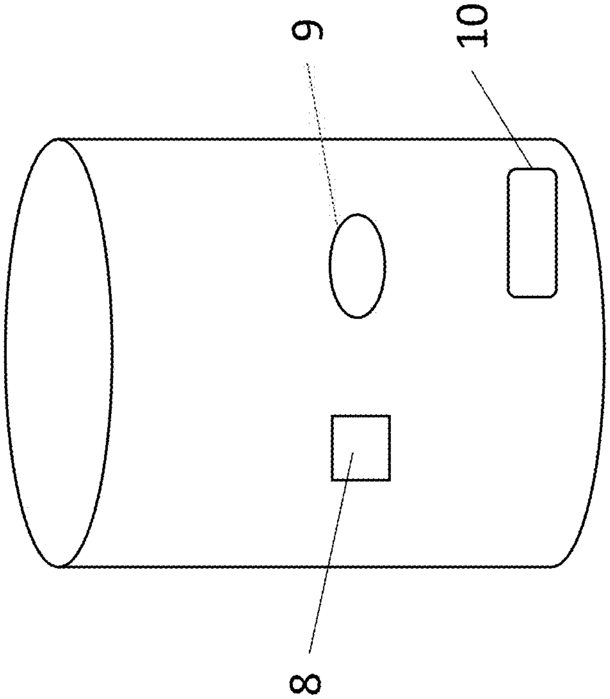
FIG. 7 depicts a remote chemical reaction facilitated by induction in accordance with an illustrative embodiment.

In another embodiment, the proposed methods and systems can be used to facilitate a chemical reaction at a distance using induction. FIG. 7 depicts a remote chemical reaction facilitated by induction in accordance with an illustrative embodiment. Two or more chemicals (8) and (9) may need heat to undergo a chemical reaction. The two or more chemicals (8) and (9) are placed/mixed in a container, which can be made from glass, plastic, etc. Also present within the container is an inductive element (10) which can provide the necessary heat, at a time determined by an individual or a control system. Specifically, the inductive element (10) receives EM radiation, which causes the inductive element (10) to heat up and facilitate the reaction between the chemicals. Thus, the reaction can occur without the need for a flame, and can be controlled from a distance. Additionally, the timing of the chemical reaction can be programmed in advance.

It is often preferable to have both control and a source of energy at a distance from a device/system to be operated. One can consider, for example, an isolated enclosure located at a distance from public oversight. This could be a bus stop enclosure late at night, an intermittently used guard post, etc. Having the enclosure heated only when it is occupied requires control, which can be provided in conjunction with a sensor and a heat source. Basing such a system on a battery, a plug, a solar array, etc. all carry the disadvantages of maintenance, theft, safety, and irresponsible overuse. In one embodiment, ferromagnetic (or other inductive) sheets or elements can be placed in the enclosure. When there is a need for heat, electromagnetic energy from an EM source located at a distance from the enclosure can be controlled to provide heat for the enclosure. Specifically, EM radiation from the EM source is directed toward the ferromagnetic sheets or other elements at a desired time and at a desired intensity to control an amount of heat for the enclosure.

In another embodiment, a drone intended to remain in the air at a fixed, designated position (or positions), can be furnished with EM radiation from the ground to enable the drone to remain aloft for an extended period of time via induction. The drone can include a small heat engine, fed by an induction element that receives EM radiation from a control system located on the ground and/or on another drone. Upon receipt of heat (via interaction of the EM radiation with the induction element), the heat engine can generate a steady flow of current to power the drone. Such a system provides savings in weight, expense, and convenience, and also provides the ability to maintain the drone in operation (off of the ground) for extended periods of time.

In addition to drones, other mobile vehicles can readily be designed to be served in this way. A steam engine traditionally carries its fuel with it (e.g., coal or oil), which is used to heat water and produce the motive power. In one embodiment, a steam boiler can be provided with ample inductive material to be able to generate the heat necessary to carry out its function. In such an implementation, EM radiation sources can be placed along a path of the steam engine and used to furnish and replenish heat to the steam engine in a predictable pattern.

Figure 8:
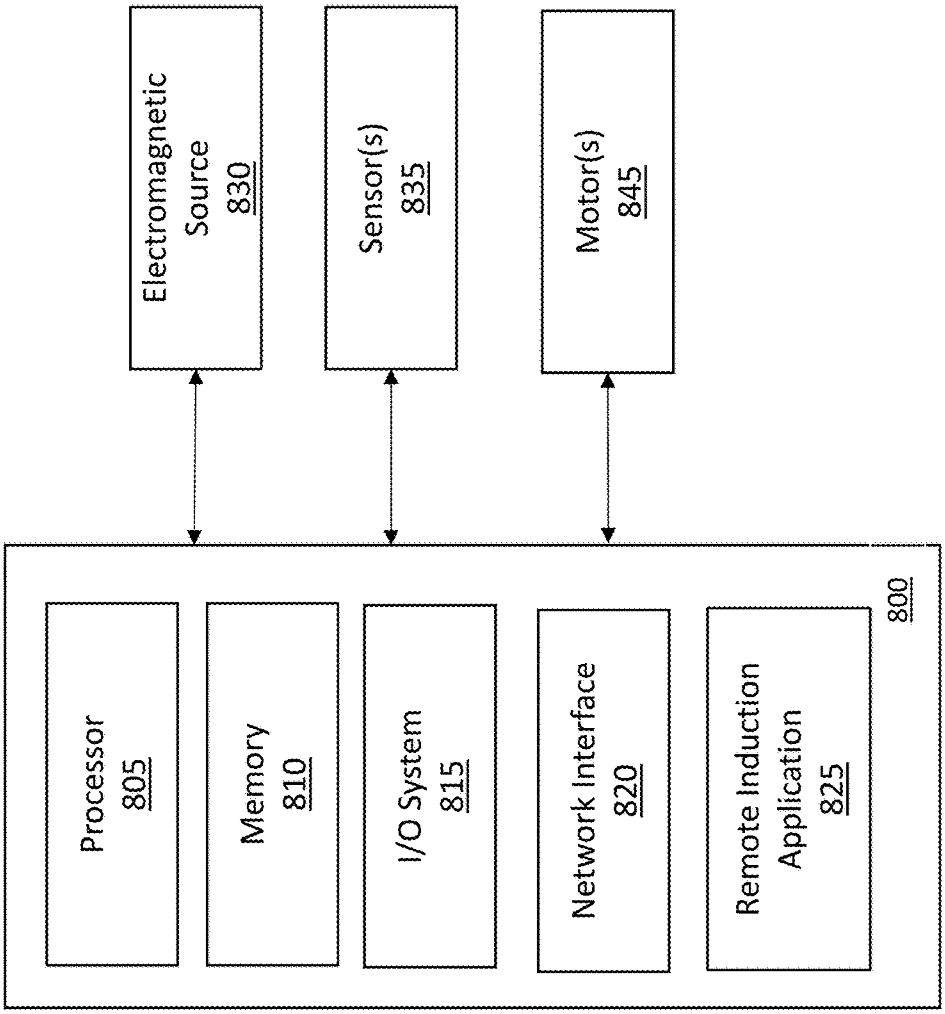
FIG. 8 is a block diagram of a computing device that operates as a system controller in accordance with an illustrative embodiment.

In an illustrative embodiment, any of the controllers described herein may be implemented at least in part as a computing device that uses computer-readable instructions stored on a computer-readable medium, such as a computer memory or storage device. Upon execution of the computer-readable instructions by a processor, the computer-readable instructions may cause the computing device to perform the operations described herein. As an example, FIG. 8 is a block diagram of a computing device that operates as a system controller 800 in accordance with an illustrative embodiment. The system controller 800 includes a processor 805, a memory 810, an input/output (I/O) system 815, a network interface 820, and a remote induction application 825. In alternative embodiments, the controller 800 may include fewer, additional, and/or different components. The components of the controller 800 communicate with one another via circuit board traces, one or more buses, or any other interconnect system.

As shown, the controller 800 is in communication with an electromagnetic source 830 (which can be any of the electromagnetic sources described herein), one or more sensors 835 (which can be temperature sensors, distance sensors, timers, etc.), and one or more motors 845 (which can be any of the motors described herein). The controller 800 is used to interact with and control these components as discussed above. The controller 800 can also communication with a network, such as the Internet, in some embodiments and/or other devices such as smartphones, laptops, servers, databases, etc.

The processor 805 of the controller 800 can be in electrical communication with and used to perform any of the operations described herein, such as gathering sensed data, processing the gathered data, controlling motors to control a position of components within the system, controlling the electromagnetic source 830 to achieve a desired amount of heat, etc. The processor 805 can be any type of computer processor known in the art, and can include a plurality of processors and/or a plurality of processing cores. The processor 805 can include a controller, a microcontroller, an audio processor, a graphics processing unit, a hardware accelerator, a digital signal processor, etc. Additionally, the processor 805 may be implemented as a complex instruction set computer processor, a reduced instruction set computer processor, an x86 instruction set computer processor, etc.

The memory 810 is used to store programs, algorithms, network and communications data, peripheral component data, the remote induction application 825, and other operating instructions. The memory 810 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 815, or user interface, is the framework which enables users (and peripheral devices) to interact with the controller 800. In alternative embodiments, the I/O system 815 can be on a remote computing device, such as a user device that is used to control the controller 800 remotely. The I/O system 815 can include one or more keys or a keyboard, one or more buttons, a speaker, a microphone, a display, etc. The I/O system 815 allows the user to interact with and control the controller system 800. The I/O system 815 can also include circuitry and a bus structure to interface with and control peripheral computing components such as one or more power sources, etc.

The network interface 820 includes transceiver circuitry (e.g., a receiver and/or a transmitter) that allows the controller 800 to transmit and receive data to/from other devices such as the sensor(s) 835, motor(s) 845, etc. In one embodiment, the network interface 820 enables communication through a network, which can be one or more communication networks. The network can include a cable network, a fiber network, a cellular network, a wi-fi network, a landline telephone network, a microwave network, a satellite network, etc. The network interface 820 also includes circuitry to allow device-to-device communication such as near field communication (NFC), Bluetooth® communication, etc.

The remote induction application 825 can include software and algorithms (e.g., in the form of computer-readable instructions) which, upon activation or execution by the processor 805, performs any of the various operations described herein such as activating sensors, recording sensed data, processing the sensed data to determine information such as a remote temperature, controlling EM sources, controlling EM radiation intensity, controlling EM radiation timing, controlling of motors to move system components, etc. The remote induction application 825 can utilize the processor 805 and/or the memory 810 as discussed above.

Figure 9:
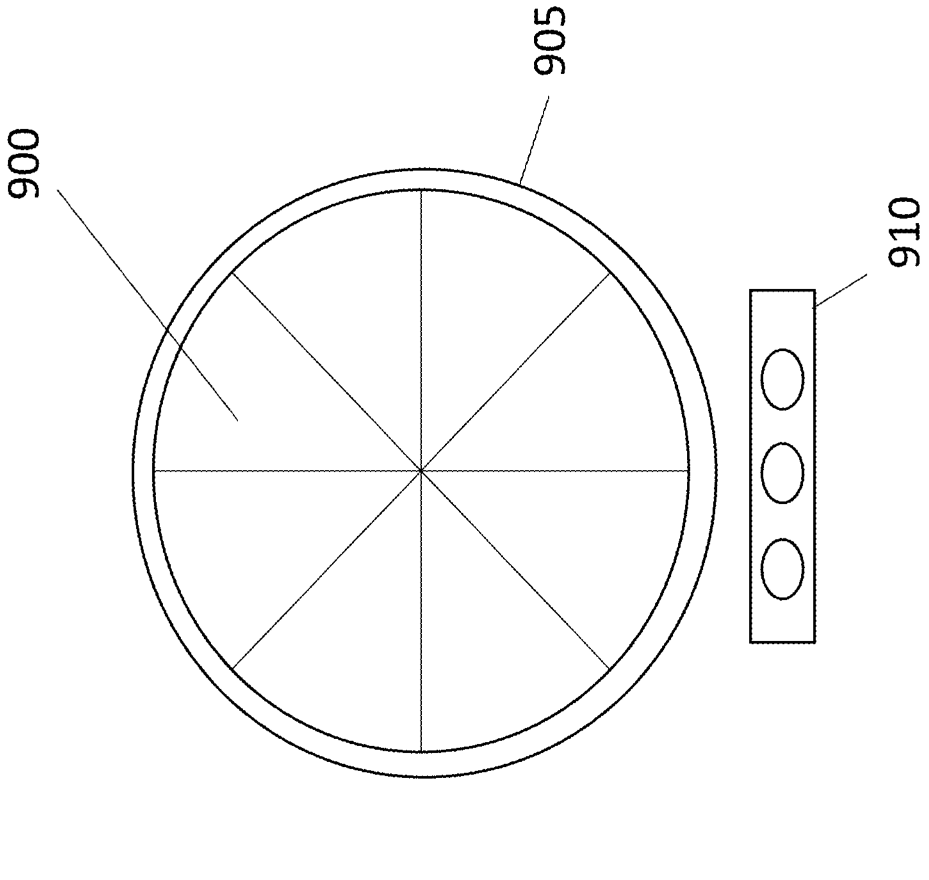
FIG. 9 depicts an induction system for monitoring a moving device in accordance with an illustrative embodiment.

FIG. 9 depicts an induction system for monitoring a moving device in accordance with an illustrative embodiment. The moving device can be any type of machine or machine component that rotates, pivots, moves back-and-forth, moves in a repetitive manner, etc., such as a wheel, a gear, a rotating cylinder, a piston, etc. The system of FIG. 9 is able to detect possible upcoming failures in such devices. As a result, maintenance can be performed in advance of the failure/breakdown. The embodiment of FIG. 9 depicts a wheel 900, although in alternative embodiments a different type of moving device may be used. Surrounding the wheel is a band of inductive (e.g., ferromagnetic) material 905. When the wheel (or other device, part, etc.) is first put into operation, electromagnetic radiation is directed at the wheel which will heat the inductive material 905.

One or more heat sensors 910 positioned on the wheel or proximate to the wheel can record a heat signature (or heat pattern) responsive to heating of the inductive material 905 as the wheel 900 is in operation. This recorded heat signature is then used going forward as a basis for comparison to determine if the wheel is operating as expected (i.e., operating the same as it was during the initial testing). For example, the wheel can be periodically (or continuously) exposed to additional electromagnetic radiation such that subsequent heat signatures can be obtained and compared to the originally recorded heat signature. If there is a difference in the heat signatures, an alert can be generated and provided to a user of the device. The alert can indicate that a change in heat signature was detected and that maintenance may be required to restore the device to its original operating condition and prevent an eventual device failure. The alert can be an audible alarm, a textual message, a audio message, etc. In an illustrative embodiment, the detected difference in heat signatures can be a difference in maximum temperature achieved, a difference in the amount of time it takes to achieve a given temperature, etc.

In another embodiment, the proposed technology can be used as an emergency heat supply using induction via a distance. Miners and others in isolated locations can keep sheets or other form factors of induction (e.g., ferromagnetic) material on hand. If the miners become trapped and heat is needed to help their survival, a beam of electromagnetic radiation (which can travel through debris) can be directed to the ferromagnetic material and used to heat it such that the trapped individuals are able to receive heat.

Figure 10A:
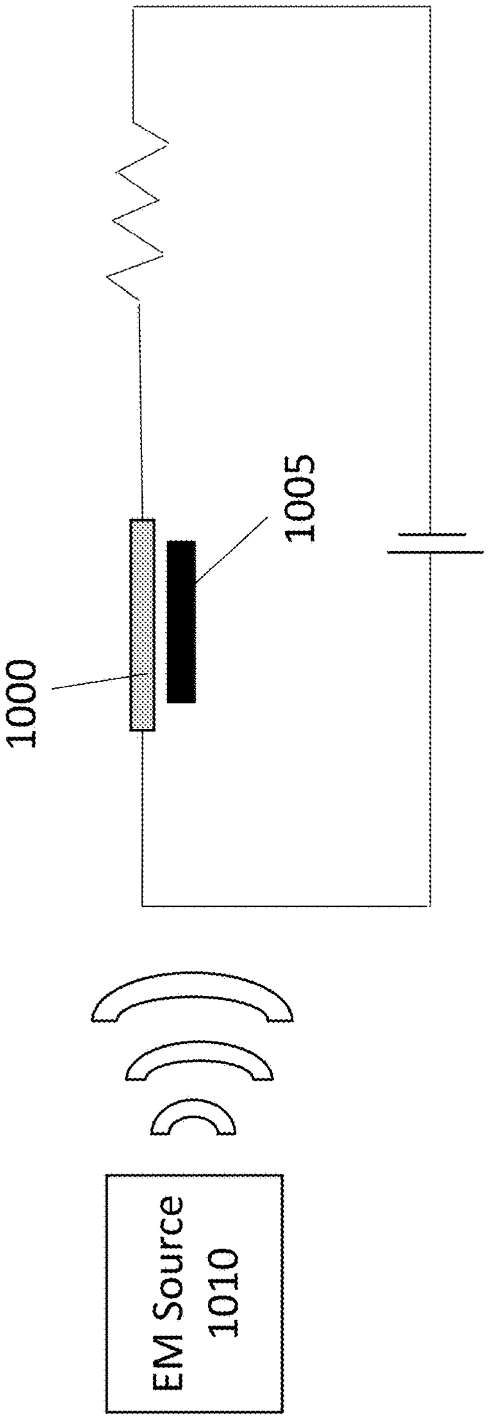
FIG. 10A shows a circuit with a meltable fuse in accordance with an illustrative embodiment.
Figure 10B:
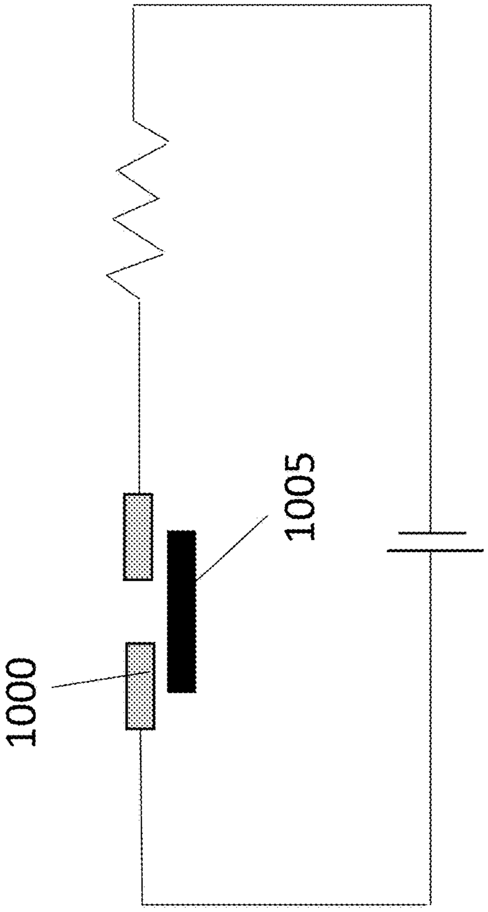
FIG. 10B shows the circuit of FIG. 10A with the meltable fuse having been melted in response to heat from the induction element in accordance with an illustrative embodiment.

In another embodiment, the proposed technology can be used to interrupt a circuit. For example, an induction element can be placed in close proximity to a fuse in a breaker box (or elsewhere) and used to melt the fuse via induction heating of the induction element. Specifically, electromagnetic radiation can be sent from a remote location to the induction element, which heats up in response to the received radiation. The heating of the induction element causes the fuse to melt, which in turn interrupts operation of the circuit in which the fuse is positioned. FIG. 10A shows a circuit with a meltable fuse 1000 in accordance with an illustrative embodiment. Placed adjacent to the meltable fuse 1000 is an induction element 1005 that is positioned to receive electromagnetic (EM) radiation emitted from an EM source 1010. It is noted that the EM source 1010 can be any device capable of generating electromagnetic radiation, and the EM source 1010 can be used in any of the embodiments described herein. In response to receiving EM radiation from the EM source 1010, the induction element 1005 is heated, which causes the meltable fuse 1000 to heat up and eventually melt, rendering the circuit non-operational. FIG. 10B shows the circuit of FIG. 10A with the meltable fuse having been melted in response to heat from the induction element 1005 in accordance with an illustrative embodiment.

In another embodiment, a plastic component can be melted from a distance and/or one or more plastic components can be bonded to another from a distance (at a selected time), by having the plastic component(s) surrounded by or adjacent to one or more induction elements. Upon induction heating of the induction elements via receipt of electromagnetic radiation, the plastic component(s) can be melted, bonded, etc. Meltable materials other than plastic can similarly be melted/bonded from a distance using induction elements and electromagnetic radiation.

In another illustrative embodiment, the proposed technology can be used to aid in control of a movable machine such as a robot. The movable machine can be programmed to perform various tasks a given location such as a home, warehouse, stadium, store, etc. The movable machine can include operating circuits, and one of the operating circuits can include a meltable fuse (or other meltable component) that can be melted to open the circuit, rendering the movable machine inoperable. In one embodiment, a human being working in the vicinity of the movable machine can wear a portable electromagnetic source. It is noted that the system is not limited to meltable fuses, and can be used to trip a relay, flip a breaker, etc. via induction to interrupt a circuit/system. If the movable machine malfunctions, goes into an area in which it is not supposed to, gets too close to the human, etc., the human being can activate the electromagnetic source, direct it to the meltable fuse, and cause the movable machine to shut down once the meltable fuse has melted.

Figure 11:
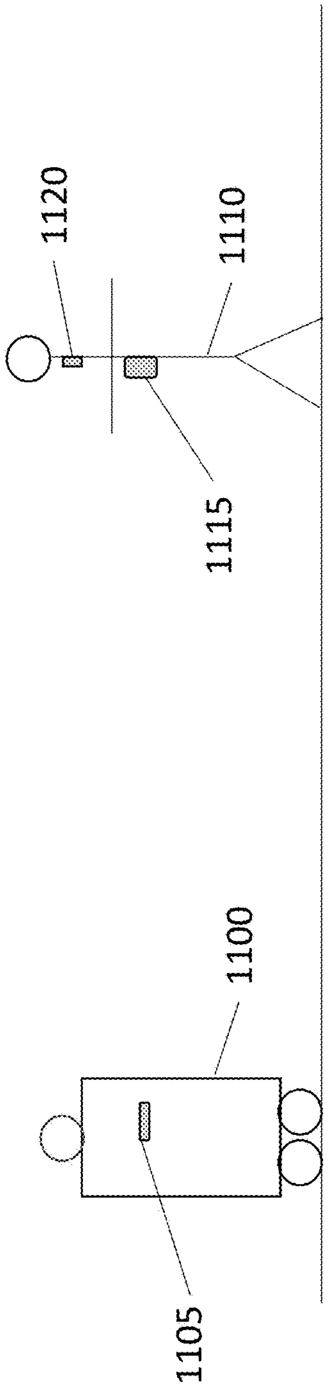
FIG. 11 shows a movable machine that can be deactivated by a human in accordance with an illustrative embodiment.

FIG. 11 shows a movable machine that can be deactivated by a human in accordance with an illustrative embodiment. In this embodiment, the movable machine 1100 is a humanoid robot. A main control circuit of the movable machine includes a meltable fuse 1105. The meltable fuse can be the same as that depicted in FIG. 10A and FIG. 10B. A human being 1110 in the vicinity of the movable machine 1100 is equipped with a portable EM source 1115. Alternatively, the EM source can be stationary and located in the vicinity of the movable machine 1100. Upon identification of an issue with the performance or function of the movable machine 1100, the human being 1110 can activate the EM source 1115 to cause the meltable fuse 1105 to melt (e.g., the meltable fuse 1105 can be positioned proximate to an induction element, as shown in FIG. 10A), which renders the movable machine 1100 inoperable. In another embodiment, the movable machine 1100 can be automatically disabled if it enters a given area or gets too close to the human being 1110. For example, the human being (and/or the movable machine 1100) may include one or more proximity sensors 1120 for determining proximity relative to other objects. If it is determined that the movable machine is within a threshold minimum distance of the human being 1110 or other location, the movable machine 1100 can be deactivated as described herein. The threshold minimum distance can be 5 meters, 10 meters, 25 meters, 40 meters, etc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system for implementing remote control of a device, the system comprising:
- a circuit element within a circuit, wherein at least a portion of the circuit element is formed from or adjacent to an induction element, wherein the circuit element comprises a meltable fuse;
- a movable machine connected to the circuit such that the circuit provides power to the movable machine;
- a proximity sensor that determines if the movable machine is within a threshold distance of an object or a location; and
- a controller remote from the device, wherein the controller includes an electromagnetic source that generates electromagnetic radiation to heat the induction element such that the circuit element changes its function or position, wherein the controller is configured to automatically activate the electromagnetic source to melt the meltable fuse in response to the movable machine being within the threshold distance of the object or the location.

2. The system of claim 1, wherein the circuit element comprises a resistor, and wherein the heat causes a resistance of the resistor to change.

3. The system of claim 1, wherein the circuit element comprises a switch that closes the circuit in response to the heat.

4. The system of claim 3, wherein the switch comprises a bimetallic switch that moves in response to the heat.

5. The system of claim 4, wherein the bimetallic switch includes a first metal and a second metal, and wherein the first metal comprises the induction element.

6. The system of claim 1, wherein the circuit element comprises a wire, and wherein a length of the wire changes in response to the heat.

7. The system of claim 6, wherein the induction element is embedded within the wire.

8. The system of claim 1, wherein the induction element comprises a block of inductive material positioned adjacent to the meltable fuse.

9. The system of claim 1, wherein the object comprises a human being.

10. The system of claim 9, wherein the proximity sensor is positioned on the human being.

11. The system of claim 9, wherein the electromagnetic source is a portable electromagnetic source positioned on the human being.

12. A method for implementing remote control of a device, the method comprising:

forming a circuit element within a circuit, wherein at least a portion of the circuit element is formed from or adjacent to an induction element, wherein the circuit element comprises a meltable fuse;

connecting a movable machine to the circuit such that the circuit provides power to the movable machine;

positioning a proximity sensor to determine if the movable machine is within a threshold distance of an object or a location; and positioning a controller remote from the device, wherein the controller includes an electromagnetic source that generates electromagnetic radiation to heat the induction element such that the circuit element changes its function or position, and wherein the controller is configured to automatically activate the electromagnetic source to melt the meltable fuse in response to the movable machine being within the threshold distance of the object or the location.

13. The method of claim 12, wherein the circuit element comprises a resistor, and wherein the heat causes a resistance of the resistor to change.

14. The method of claim 12, wherein the circuit element comprises a switch that closes the circuit in response to the heat.

15. The method of claim 12, wherein the circuit element comprises a wire, and wherein a length of the wire changes in response to the heat.

* * * * *